Nov. 20, 1962     M. W. REYNOLDS     3,064,861
AGRICULTURAL DISPENSING HOPPER
Filed March 21, 1960     3 Sheets-Sheet 1
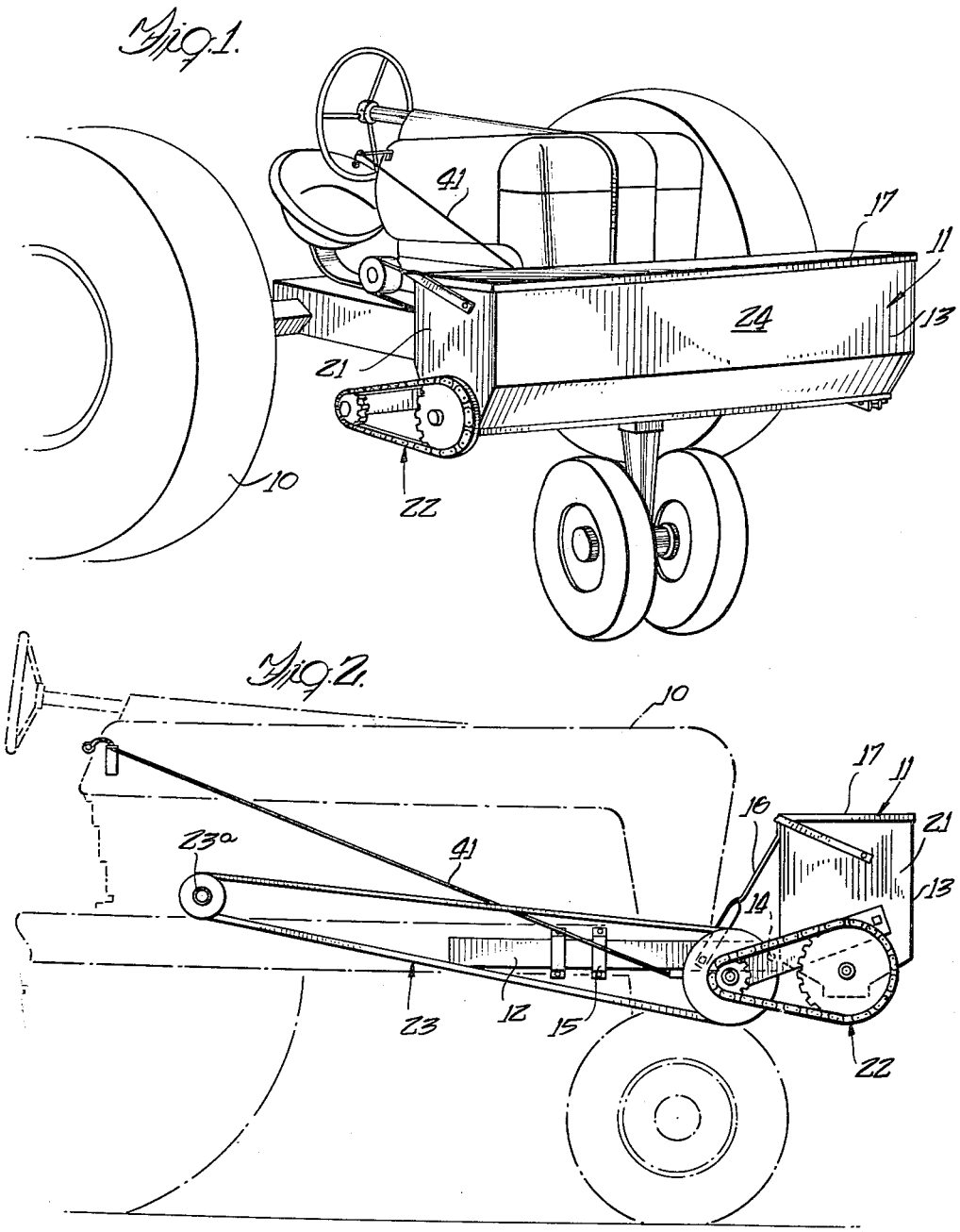
Inventor
Marlyn Ward Reynolds
Dawson, Tilton, Fallon & Lungmus
Attorneys

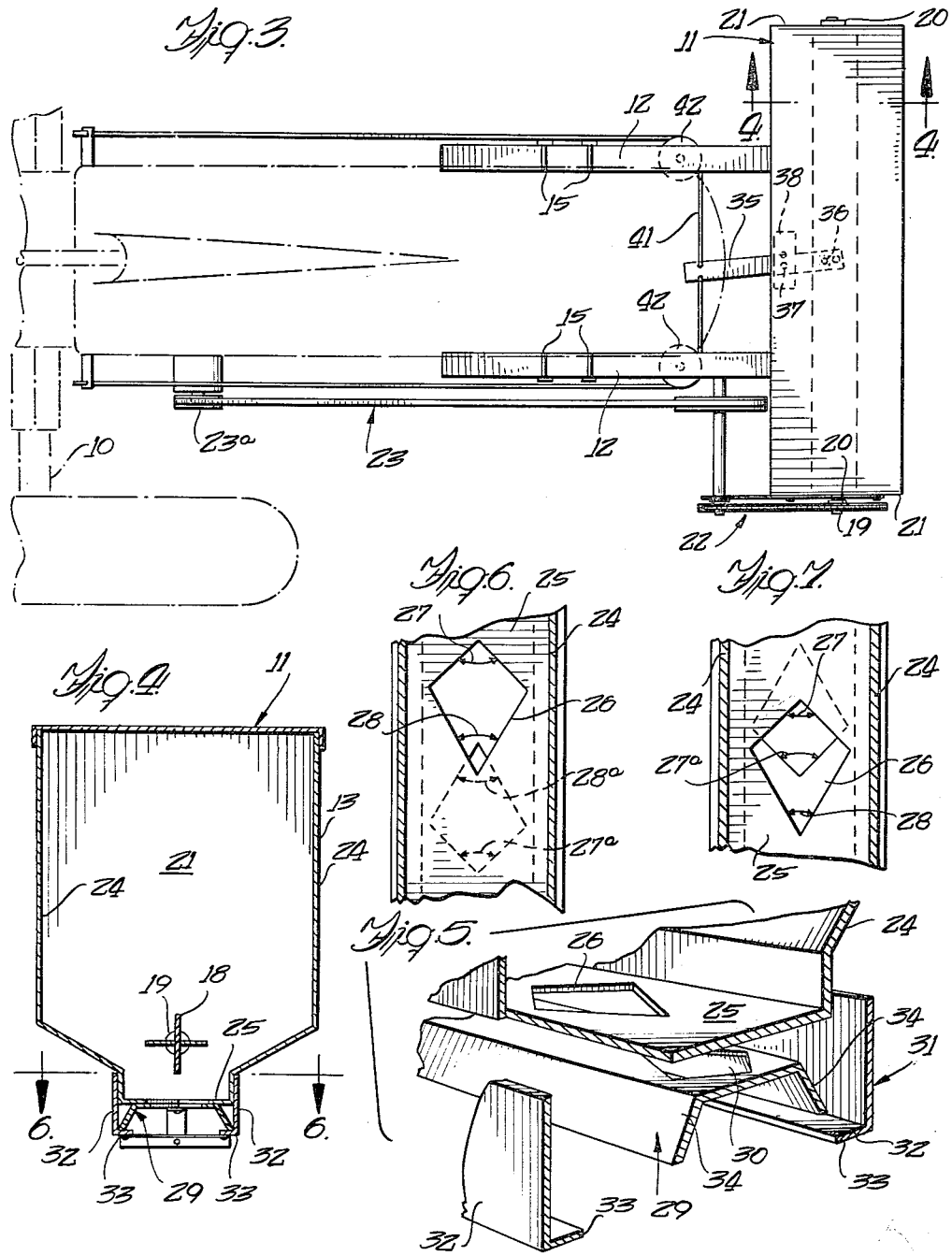

Nov. 20, 1962 M. W. REYNOLDS 3,064,861
AGRICULTURAL DISPENSING HOPPER
Filed March 21, 1960 3 Sheets-Sheet 3
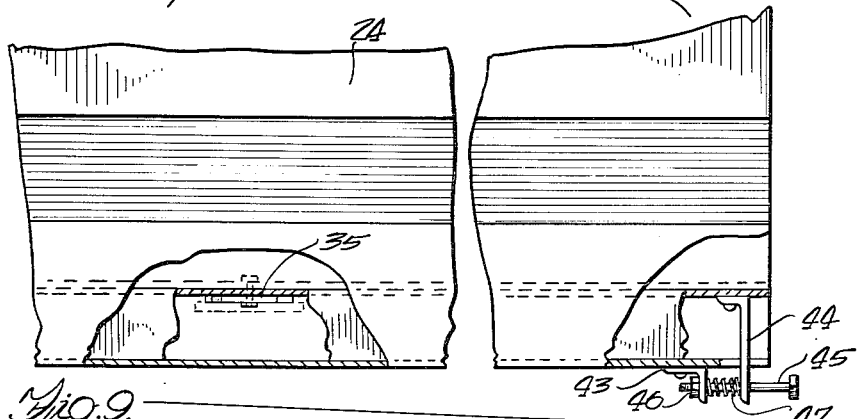
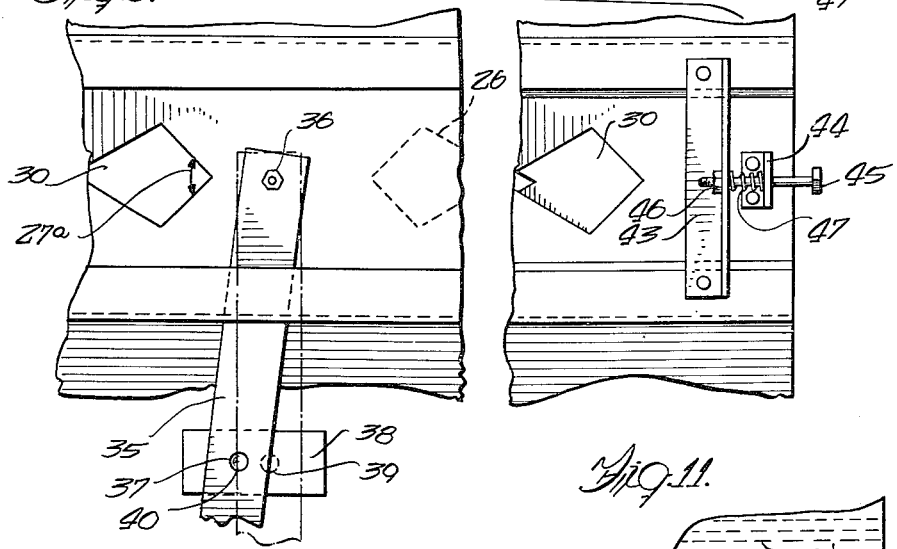
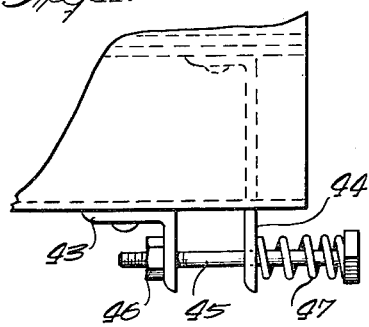
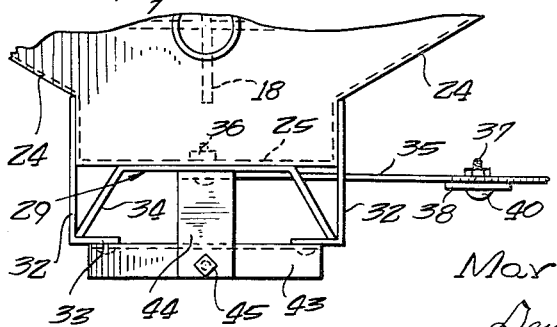
Inventor
Marlyn Ward Reynolds
Dawson, Tilton, Fallon & Lungmus
Attorneys United States Patent Office 3,064,861
Patented Nov. 20, 1962

3,064,861
AGRICULTURAL DISPENSING HOPPER
Marlyn Ward Reynolds, Altona, Ill.
Filed Mar. 21, 1960, Ser. No. 16,535
3 Claims. (Cl. 222—178)

This invention relates to an agricultural dispensing hopper, and, more particularly, to apparatus that provides for the dispensing of fertilizer, insecticide, etc., over farm areas when transported by a tractor, or the like.

This application is a continuation-in-part of my copending application, Serial No. 821,585, filed June 19, 1959.

It is an object of this invention to provide a novel dispensing hopper, especially adapted for agricultural use in that it may be transported by conventional farm equipment, i.e., tractors, plows, harrows, etc., so as to permit simultaneous soil improvement operations.

Another object is to provide an agricultural dispensing hopper, portable on a tractor, or the like, which incorporates a novel mechanism for the dispensing of granular material, whereby materials of widely differing particles characteristics can be spread uniformly.

Still another object is to provide a novel agricultural hopper-type dispenser suited for farm implement mounting in which an apertured gate is shiftable relative to the apertured hopper bottom to provide fine control in the dispensing of granular material through selective register of the paired openings in the gate and hopper bottom and in which means are provided for selectively and temporarily enlarging the register.

Yet another object is to provide an agricultural dispensing hopper equipped with an adjustable gate which incorporates novel means for regulating the discharge of granular material so that a uniform deposit can be achieved independent of article character and in which the flow rate can be quickly and expeditiously changed for a desired period and thereafter returned to a pre-selected value equally quickly and expeditiously. Other objects and advantages of this invention can be seen as this specification proceeds.

The invention, in an illustrative embodiment, will be explained in conjunction with the accompanying drawings, in which:

FIG. 1 is a fragmentary perspective view of a tractor equipped with the dispensing hopper of the invention;

FIG. 2 is a side elevational view of the hopper, with the tractor shown in phantom line;

FIG. 3 is a top plan view of the apparatus seen in FIG. 2;

FIG. 4 is a sectional view taken along the line 4—4 of FIG. 3;

FIG. 5 is a fragmentary exploded perspective view of the bottom portion of the hopper;

FIG. 6 is a sectional view, taken along the line 6—6 of FIG. 5;

FIG. 7 is a view similar to FIG. 6 but with the parts in different operative condition;

FIG. 8 is a fragmentary front elevational view of the hopper with portions of the walls broken away;

FIG. 9 is a bottom plan view of the device seen in FIG. 8;

FIG. 10 is a fragmentary and elevational view of the apparatus seen in FIG. 8; and FIG. 11 is a fragmentary elevational view of the extreme lower right-hand portion of FIG. 8 but with the elements thereof in a different operative condition.

In the attached drawing illustrating an embodiment of the invention, the numeral 10 designates a tractor and the numeral 11 generally a dispensing hopper releasably attached to the front end of the tractor 10. The basic construction of the hopper body and its mode of releasable attachment is essentially similar to the showing and description in my above-mentioned application, and reference may be had to that case for details of construction and modes of operation not herein given.

As can be appreciated from the drawing, and in particular FIGS. 2 and 3, the dispensing hopper 11 is equipped with rearwardly-extending arms 12 which achieve the connection between the hopper body 13 and the tractor 10. It will be appreciated that the hopper body 13, through the arms 12, may be attached to a wide variety of agricultural implements such as plows, harrows, etc.

The arms 12 are pivotally connected to the body 13 and in the illustration given are seen to be hollow beams apertured for the rotatable receipt of a pipe 14, as seen in FIG. 2. The pipe 14 is suitably secured in a stationary and rigid fashion to the body 13. The arms 12 adjacent the ends thereof remote from the connection with pipe 14, are connected to the tractor frame as at 15. The body 13 is stabilized through the connection of struts 16 (see FIG. 2) extending between and connected to the body 13 and the arms 12.

By first attaching the arms 12 to the tractor 10, it is possible to orient the body 13 in a position most convenient to the installing operation. The body 13 may be supported in a wide variety of angular positions during the initial connection of the arms 12 to the tractor 10 without affecting that connection. Thereafter, the struts 16 may be connected to the arms 12, or alternatively, the tractor 10, to stabilize the hopper body 13.

If desired, the hopper body may be equipped with a pivotally-mounted cover 17. The body 13 is interiorly equipped with an agitator 18 mounted on an agitator shaft 19, best seen in FIG. 4. The shaft 19 is suitably journaled in bearings 20 provided in the end walls 21 of the hopper body 13, best seen in FIG. 3. Rotation of the agitator 18 is achieved through a chain and sprocket mechanism generally designated 22 and a belt and sheave system generally designated 23, which interconnect the shaft 19 with the power take-off 23a of the tractor 10.

The side walls 24 of the hopper body 13 are inclined downwardly and inwardly to provide a conventional hopper shape. The side walls 24 are connected together along their bottom edges by a flat bottom wall 25, which is located just below the agitator 18, and which can be readily appreciated from a consideration of FIG. 4. As can be seen clearly in the drawings, the bottom wall 25 is equipped with a plurality of longitudinally spaced-apart, longitudinally-aligned apertures 26.

Referring now to FIG. 3, the shape of the aperture can be clearly seen. Each aperture 26 is seen to include a generally diamond-shaped opening, the quadrilateral, however, being modified so that one pair of adjacent sides is longer than another pair of adjacent sides. In the illustration given, the diamond-opening corners aligned with with the longitudinal dimension of the hopper body 13 includes angles of different sizes. The angle 27 is seen to be about a 90° angle, while the angle designated 28 is seen to be about a 45° angle.

Cooperating with the apertures 26 in the bottom wall 25 is an apertured gate generally designated 29, which is mounted immediately below the bottom wall 25 and in which a similar plurality of apertures 30 are provided. The apertures 30 are spaced similarly to the apertures 26 and are identically shaped. However, the apertures 30 are reversely oriented in that the larger angles 27a therof are all adjacent one end of the hopper body 13, while the angles 27 of the bottom wall 25 are adjacent the other end of the hopper body 13. By mechanism to be described hereinafter, it is possible to move the gate 29 longitudinally of the hopper body 13 and thereby achieve different degrees of register of the apertures 26 and 30. By positioning the large angles 27a and 27 in superposition or register (see FIG. 7), a laterally enlarged opening is achieved which is especially adapted for the dispensing of large particled granular materials and materials that demonstrate a tendency to cake. On the other hand, where very limited quantities of granular material, especially of a noncaking nature, are desired to be distributed, the smaller angles 28 and 28a are brought into register, as is seen in FIG. 6.

Supporting the gate 29 for slidable movement relative to the bottom wall 25, is a guide generally designated 31, consisting of a pair of laterally spaced-apart tracks 32. Each track 32 may be a formed sheetmetal element secured at its upper end to the hopper body 13 as by welding. At its lower end, each track 32 is equipped with an inwardly-extending lip 33. The gate 29, in the illustration given, is seen to have an essentially inverted U shape in transverse section, the legs 34 of the U-shape resting upon the inwardly-turned lips 33 of the tracks 32, while the flat portion of the U shape bears against the underside of the bottom wall 25. In the base portion of the U-shaped cross section of the gate 29 are the apertures 30.

Providing the slidable movement of the gate 29 is a handle 35. The handle 35 is pivotally connected as at 36 to the gate 29 and spaced rearwardly of the connection 36 is connected as at 37 to a support plate 38 on the hopper body 13. The support plate is equipped with a second pivotal connection as at 39 (see FIG. 9), the connections 37 and 39 consisting of shaft holes in which the connecting pin 40 is adapted to be inserted. When the handle 35 is connected to the plate 38 through the shaft hole 37, as shown, the smaller angles 28 and 28a are in overlapping relation, as seen in FIG. 9 and FIG. 6. When the pin 40 extends through the shaft opening 39, the larger angles are in register, as in FIG. 7.

By turning the handle in a horizontal plane, the gate 29 is shifted or reciprocated laterally a small distance. This achieves a change in the degree of register of the openings 26 and 30.

To provide for this shifting from the driver's seat of the tractor 10, the handle 35 is connected to a cable 41, the cable 41 being entrained in sheaves 42, the sheaves 42 being rotatably mounted on the arms 12, best seen in FIG. 3.

The hopper body 13 and the gate 29 are equipped with longitudinally-aligned, depending lugs 43 and 44, respectively (see FIGS. 8–11). These lugs are apertured for the receipt of a bolt 45, which extends outwardly of both lugs and is equipped with a nut 46. The bolt also carries a coiled spring 47 which is effective to resiliently limit the maximum degree of registry of the superposed apertures 26 and 30.

In the operation of the apparatus, and after the hopper 11 has been installed on the tractor 10, as seen in FIG. 1, the farmer decides which type of opening is suitable for the granular material to be distributed. If the material requires a change in the type of openings, i.e., from the small angle to the large angle, the handle 35 is pivoted over the opening 39 instead of over the opening 37. Also, the spring 47 is relocated from the position seen in FIG. 8 to the position seen in FIG. 11. The length of the spring determines the maintained opening defined by the registered portions of apertures 26 and 30. However, by pulling the cable 41, it is possible to completely eliminate any register so as to close the discharge openings in the bottom of the hopper. When the tractor is turning around at the end of a given furrow, or the like, additional material can be deposited merely by pulling against the cable 41 and compressing the spring 47 somewhat so as to enlarge the register. Thereafter, release of the cable 41 returns the gate to its original position relative to the hopper bottom 25.

The same type of operation for a dissimilar granular material is achieved through the employment of the smaller angles of the apertures 26 and 30. To provide for this, the farmer relocates the pivotal connection of the handle 35 to the opening 37 and also relocates the spring 47 from its FIG. 11 position to the position of FIG. 8.

While, in the foregoing specification, I have set forth a detailed description of an embodiment of the invention for the purpose of explanation thereof, it will be appreciated that many modifications in the details herein given may be made by those skilled in the art without departing from the spirit and scope of the invention.

I claim:

1. A dispensing hopper adapted to be mounted on agricultural implements, comprising an elongated hopper body having a flat bottom wall equipped with a plurality of longitudinally-spaced apertures, each aperture being generally diamond-shaped with a pair of opposite corners being longitudinally aligned, said body being equipped with a pair of laterally spaced-apart tracks disposed on opposite sides of said bottom wall, an elongated gate having a generally inverted U shape in transverse section positioned in said tracks and contacting the underside of said bottom wall, said gate being equipped with a plurality of apertures arranged and formed to cooperate with said bottom wall apertures, handle means interconnecting said gate and body for shifting said gate relative to said bottom wall, and means interconnecting said gate and body resiliently limiting the maximum registry of said gate and bottom wall apertures, said gate being positionably mounted in said body and operative to oppose said resiliently limiting means in different gate positions to enlarge the registry of said gate and bottom wall apertures, one of said opposite corners including an angle larger than the angle included by the other opposite corner, said one opposite corner in each aperture being adjacent one end of said bottom wall, said one opposite corner in each aperture in said gate being adjacent the other end of said gate, said handle means being equipped with stop means for positioning said handle means in two alternative positions, one of said positions having said one opposite corners of said gate and bottom wall in register while the other of said positions has said other opposite corners of said gate and bottom wall in register, whereby said other position defines registered openings smaller than said one position.

2. In an agricultural dispensing device for fertilizer, and the like, a hopper having an apertured planar bottom fall, an apertured gate slidably mounted on said hopper below said bottom wall, the apertures in both of said bottom wall and gate including generally diamond-shaped openings movable into varying degrees of registry, opposite diamond-shaped corner openings being aligned with the direction of movement of said gate with one of said opposite corners including a larger angle than the other, the openings in said gate being reversely oriented relative to the openings in said bottom wall, said hopper being equipped with a pair of support arms extending therefrom and transverse to the direction of movement of said gate for attaching said hopper to an agricultural implement, said hopper being equipped with a lever support adjacent said arms, means for pivotally mounting a lever in two different positions on said support, said lever being pivotally connected to said gate, one lever position on said support bringing said one opposite corner openings of said bottom wall and gate into registry and the other lever position bringing said other opposite corner openings into registry, said gate and hopper each being equipped with apertured depending lugs aligned in the direction of movement of said gate, a nut-equipped bolt mounted in the lug apertures and extending beyond each lug, and a spring on said bolt effective to resiliently limit the degree of registry of said bottom wall and gate openings.

3. In combination with a tractor, a dispensing hopper for fertilizer, or the like, said hopper including an elongated body having a flat bottom wall, the length of said body being disposed transverse of the direction of travel of said tractor, a pair of longitudinally spaced arms pivotally connected to said body and attached to said tractor to position said body forwardly of said tractor, a pair of struts extending rearwardly of said body and connected to said arms to stabilize said body, said body being equipped with a longitudinally slot-equipped guide below said bottom wall, a gate slidably mounted in said guide in contact with the underside of said bottom wall, each of said gate and bottom wall having a plurality of longitudinally spaced, longitudinaly aligned diamond-shaped openings, each opening having a larger angle at one end than at the other, with the larger angle in each gate opening being closer one end of said body than the opposite angle in said gate opening, the larger angle of each bottom wall opening being closer the other end of said body than the opposite angle insaid bottom wall opening, spring means interposed between said gate and hopper operative to resiliently limit the maximum degree of registry of said bottom wall and gate openings, a handle pivotally mounted on a support on said hopper and pivotally connected to said gate, said support being equipped with means for mounting said handle in two different positions, and cable means secured to said handle and entrained on sheave means on said arms and extending to the tractor driver's seat to permit movement of said handle and sliding of said gate.

References Cited in the file of this patent

UNITED STATES PATENTS

| | | |
|---|---|---|
| 2,717,725 | Bennett | Sept. 13, 1955 |
| 2,772,038 | Morrissey | Nov. 27, 1956 |
| 2,792,970 | Gaiman | May 21, 1957 |
| 2,854,172 | Buhr et al. | Sept. 30, 1958 |